US011797457B2

(12) United States Patent
Shiratori et al.

(10) Patent No.: US 11,797,457 B2
(45) Date of Patent: Oct. 24, 2023

(54) ELECTRONIC APPARATUS AND METHOD FOR CONTROLLING DATA UPDATE PROCESSING ON MEMORY

(71) Applicant: KABUSHIKI KAISHA TOSHIBA, Tokyo (JP)

(72) Inventors: Kento Shiratori, Kawasaki Kanagawa (JP); Hiroaki Tanaka, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/467,634

(22) Filed: Sep. 7, 2021

(65) Prior Publication Data
US 2022/0091999 A1 Mar. 24, 2022

(30) Foreign Application Priority Data

Sep. 18, 2020 (JP) .................................. 2020-157428

(51) Int. Cl.
*G06F 12/14* (2006.01)

(52) U.S. Cl.
CPC ...... *G06F 12/1491* (2013.01); *G06F 12/1408* (2013.01); *G06F 12/1425* (2013.01); *G06F 12/1466* (2013.01)

(58) Field of Classification Search
CPC ............. G06F 12/1408; G06F 12/1425; G06F 12/1466; G06F 12/1491; Y02D 10/00
See application file for complete search history.

(56) References Cited

U.S. PATENT DOCUMENTS

| 5,901,311 | A   | * | 5/1999  | Labatte ............... G06F 12/1466 726/17 |
| 6,198,657 | B1  |   | 3/2001  | Uekubo et al.                          |
| 8,645,717 | B2  |   | 2/2014  | Flynn                                  |
| 2008/0320263 | A1 |  | 12/2008 | Nemiroff et al.                        |
| 2009/0121028 | A1 | * | 5/2009  | Asnaashari ......... G06F 12/0238 235/492 |
| 2015/0186659 | A1 | * | 7/2015  | Leslie-Hurd ........ G06F 12/1466 726/1 |

(Continued)

FOREIGN PATENT DOCUMENTS

| JP | 2000-268584 A | 9/2000  |
| JP | 2002-312186 A | 10/2002 |

(Continued)

*Primary Examiner* — Aracelis Ruiz
(74) *Attorney, Agent, or Firm* — Finnegan, Henderson, Farabow, Garrett & Dunner, LLP

(57) ABSTRACT

An electronic apparatus according an embodiment includes a first memory, a second memory, a gate device, and one or more hardware processors. The first memory stores information. The second memory stores state information indicating whether or not update on the information of the first memory is allowed. The gate device is provided on a bus and controls whether or not to permit access to the second memory based on a control instruction. In a predetermined mode, the one or more hardware processors output, to the gate device, a control instruction to permit access to the second memory, set the state information of the second memory to indicate an updatable state, and update the information of the first memory.

8 Claims, 9 Drawing Sheets

(56) References Cited

U.S. PATENT DOCUMENTS

| | | | |
|---|---|---|---|
| 2015/0212950 A1* | 7/2015 | Ono | G06F 12/1441 |
| | | | 711/163 |
| 2017/0032126 A1 | 2/2017 | Koike et al. | |
| 2017/0060782 A1* | 3/2017 | Chinnakkonda Vidyapoornachary | G06F 12/1466 |
| 2017/0091120 A1* | 3/2017 | Gopal | G06F 12/1408 |
| 2021/0232510 A1* | 7/2021 | Ndu | G06F 12/1441 |

FOREIGN PATENT DOCUMENTS

| | | |
|---|---|---|
| JP | 2009-3933 A | 1/2009 |
| JP | 5403771 B2 | 1/2014 |
| JP | 2017-33149 A | 2/2017 |
| JP | 2018-117185 A | 7/2018 |

* cited by examiner

FIG.7A

NO MONOTONICITY
1→0, 0→1
BOTH CHANGES

DATA 1  00000011
         ↓ ↓
DATA 2  00000110

FIG.7B

MONOTONICITY
0→1
ONLY ONE CHANGE

DATA 1  00000011
         ↓↓
DATA 2  00001111

ELECTRONIC APPARATUS AND METHOD FOR CONTROLLING DATA UPDATE PROCESSING ON MEMORY

CROSS-REFERENCE TO RELATED APPLICATIONS

This application is based upon and claims the benefit of priority from Japanese Patent Application No. 2020-157428, filed on Sep. 18, 2020; the entire contents of which are incorporated herein by reference.

FIELD

Embodiments described herein relate generally to an electronic apparatus and a method.

BACKGROUND

There is a technique of performing update processing using a temporary memory area when data is updated. When updating data, it is desirable that reliability of data update processing is enhanced.

BRIEF DESCRIPTION OF THE DRAWINGS

FIG. 7A is a diagram illustrating an example where there is no monotonicity between pieces data;

FIG. 7B is a diagram illustrating an example where there is monotonicity between pieces of data;

DETAILED DESCRIPTION

An electronic apparatus according to an embodiment includes a first memory, a second memory, a gate device, and one or more hardware processors. The first memory is configured to store information. The second memory is configured to store state information indicating whether or not update on the information in the first memory is allowed. The gate device is provided on a bus and configured to control whether or not to permit access to the second memory based on a control instruction. The one or more hardware processors are configured to, in a predetermined mode, output, to the gate device, a control instruction to permit access to the second memory, set the state information of the second memory to indicate an updatable state, and update the information in the first memory.

Hereinafter, as an example, a microcomputer to which an information processing apparatus according to an embodiment is applied will be described with reference to the accompanying drawings. Note that an apparatus to which the information processing apparatus according to the embodiment can be applied is not limited to a microcomputer. The information processing apparatus according to the embodiment can be applied to any apparatus including a memory in which a computer program is stored, and a processor that executes the computer program. Note that the present invention is not limited by this embodiment.

First Embodiment

Figure 1:
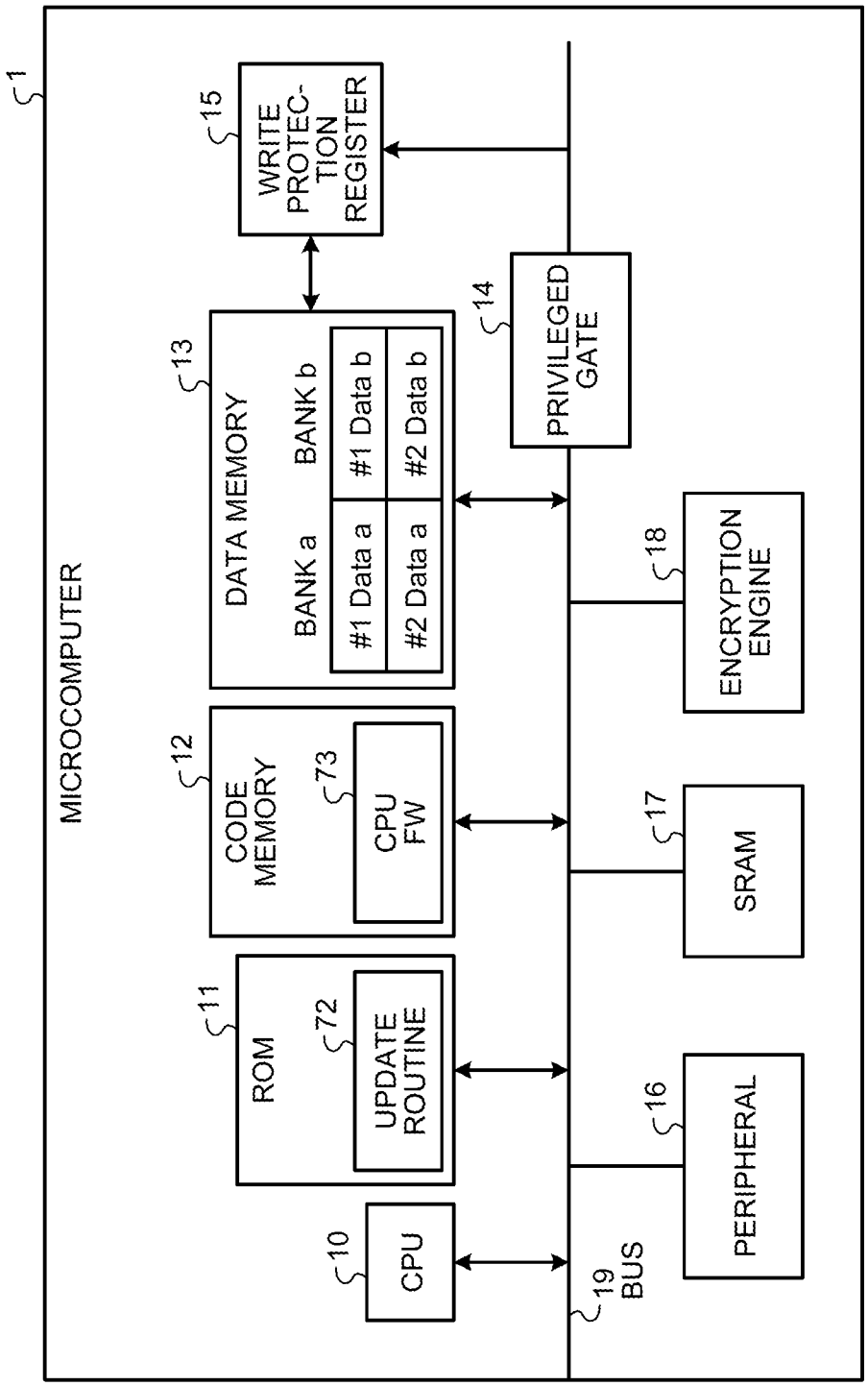
FIG. 1 is a schematic diagram illustrating an example of a hardware configuration of a microcomputer to which an information processing apparatus according to a first embodiment is applied.

FIG. 1 is a schematic diagram illustrating an example of a hardware configuration of a microcomputer to which an information processing apparatus according to a first embodiment is applied.

A microcomputer 1 includes a CPU 10, a ROM 11, a code memory 12, a data memory 13, a privileged gate 14, a write protection register 15, a peripheral 16, an SRAM 17, an encryption engine 18, and a bus 19. The code memory 12 and the data memory 13 are configured by rewritable nonvolatile memories.

The CPU 10 (an example of the one or more hardware processors) is a processor capable of executing various programs, and is a so-called core processor. The CPU 10 implements a function according to the program. By executing the program, the CPU 10 operates in a privileged mode where update of data in the data memory 13 is allowed, or operates in a normal mode where update of data in the data memory 13 is not allowed. In the CPU 10, information indicating an operating mode is stored in a register.

In the normal mode, a program using a normal function is executed. During the normal mode, the space accessible by the CPU 10 is not the entire microcomputer 1. For example, access to important information, such as a setting value for controlling the behavior of the microcomputer 1 itself, is restricted. On the other hand, in the privileged mode, the CPU 10 can perform access without limitation. During the privileged mode, important information stored in the data memory 13 can be updated.

The ROM 11 is a non-rewritable nonvolatile memory. The program stored in the ROM 11 is written when the microcomputer 1 is manufactured in hardware, and cannot be changed when the microcomputer 1 is in operation. The ROM 11 stores an update routine 72. The update routine 72 is a program for executing update processing.

The code memory 12 stores programs for implementing various functions. Specifically, the code memory 12 stores a CPUFW 73. The CPUFW 73 is firmware executed by the CPU 10. Note that the code memory 12 may store other various programs. The code memory 12 can be written even after hardware manufacture of the microcomputer 1, and can be rewritten during operation.

The data memory 13 (an example of the first memory) stores various data. Specifically, the data memory 13 stores important data including, for example, information for identifying the microcomputer 1, such as chip unique information. The chip unique information is data having a size of about several Kbytes. In addition, the data memory 13 stores data by a plurality of banks. For example, as illustrated in FIG. 1, the data memory 13 stores data with double buffering ("Bank a" and "Bank b") where the size of each bank is a unit of buffer.

The privileged gate 14 (an example of the gate device) is a gate section that is provided on the bus 19 and controls whether or not to permit access to the write protection register 15 on the basis of a control instruction from the CPU 10. When the CPU 10 operates in the privileged mode, the privileged gate 14 permits access to the write protection register 15.

The write protection register 15 (an example of the second memory) is a register used for controlling whether update on the data memory 13 is allowed, depending on the mode. The write protection register 15 stores flag information (an example of the state information) indicating whether update on the data memory 13 is allowed or not. The flag information indicates a non-updatable state in the normal mode, and is changed to information indicating an updatable state when an update instruction is issued in the privileged mode. By using the flag information, update on data stored in the data memory 13 is controlled.

The peripheral 16 is a hardware component group that provides a specific function that supplements the function of the CPU 10. The hardware component group included in the peripheral 16 includes a communication module capable of communicating with an external device.

The SRAM 17 is a volatile memory. The SRAM 17 functions as an area in which various programs are loaded, and an area in which data at the time of executing the programs is temporarily stored. The SRAM 17 also functions as a buffer for user data transferred between the external device and the microcomputer 1.

The encryption engine 18 is a hardware component that executes a cryptographic algorithm. The encryption engine 18 calculates a hash value. For example, the encryption engine 18 generates a random number, encrypts the random number with a common key, and calculates a hash value.

Figure 2:
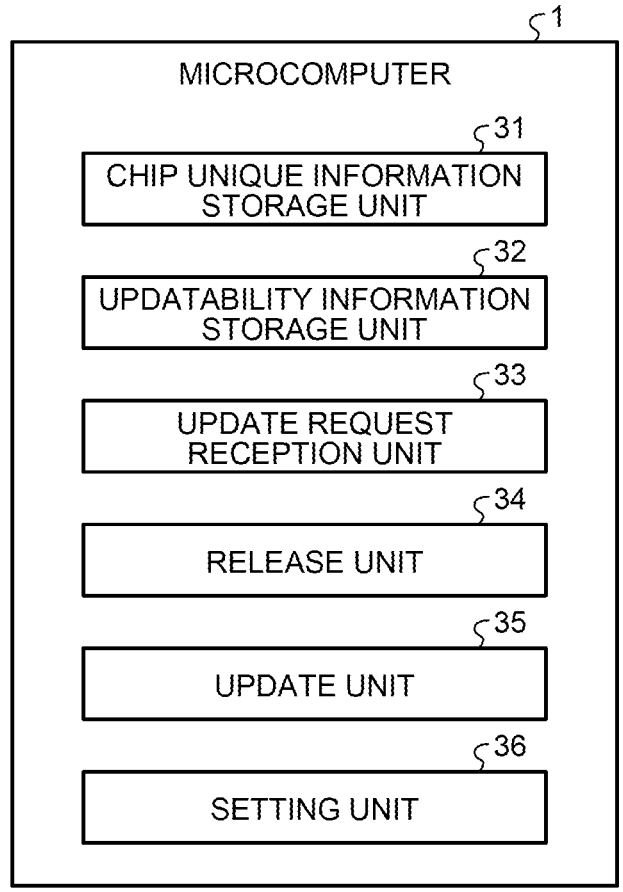
FIG. 2 is a block diagram illustrating an example of a functional configuration of a microcomputer 1 according to the first embodiment.

FIG. 2 is a block diagram illustrating an example of a functional configuration of the microcomputer 1 according to the first embodiment. The microcomputer 1 illustrated in FIG. 2 includes a chip unique information storage unit 31, an update request reception unit 33, a release unit 34, an update unit 35, and a setting unit 36. The chip unique information storage unit 31 is implemented by the data memory 13. Furthermore, the CPU 10 executes the programs stored in the ROM 11 and the code memory 12 to implement the update request reception unit 33, the release unit 34, the update unit 35, and the setting unit 36. In addition, the update request reception unit 33, the release unit 34, the update unit 35, and the setting unit 36 function as a control unit.

Figure 3:
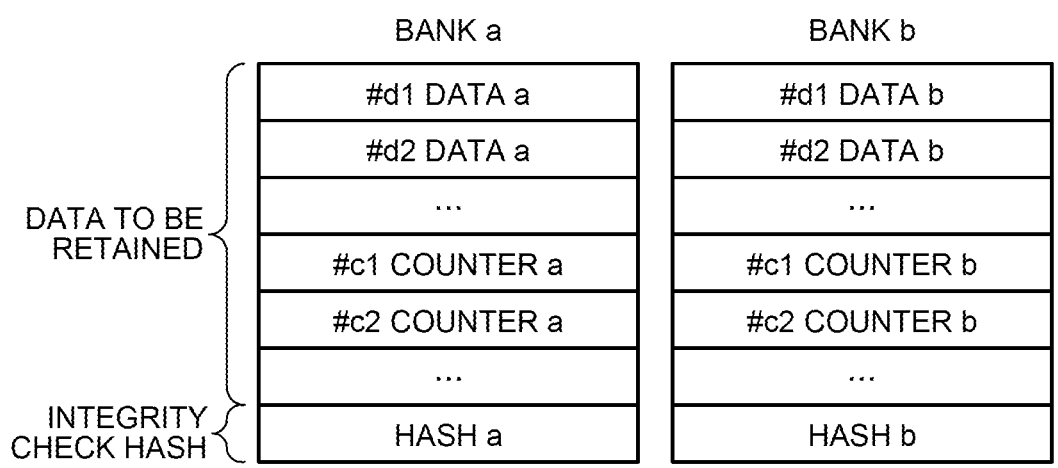
FIG. 3 is an example of data stored in a chip unique information storage unit 31 according to the first embodiment.

The chip unique information storage unit 31 stores information to be updated, which includes chip unique information. FIG. 3 is an example of data stored in the chip unique information storage unit 31 according to the first embodiment. The chip unique information storage unit 31 stores data in a plurality of banks. For example, as illustrated in FIG. 3, data is stored in two banks (for double buffering). Each bank includes data, such as data of a key, and a counter, as chip unique information. The data and the counter are associated with identification information such as "#d1" and "#c1" illustrated in FIG. 3.

Each bank includes a hash value for checking the integrity of the corresponding bank. The hash value is a cryptologic hash value calculated for the data. As a calculation algorithm of the hash value, SHA2, SHA3, or the like can be used.

When the data and the counter stored in each bank are not updated, the data and the counter stored in each bank have the same contents.

An updatability information storage unit 32 stores information indicating whether or not updating is allowed. The updatability information storage unit 32 is implemented by the write protection register 15.

The update request reception unit 33 receives an update request for data when it is made by an operation of a user on the microcomputer 1. The update request reception unit 33 receives the update request together with update data being an update target and an update data number which is identification information of the update target data. Upon receiving the update request, the update request reception unit 33 calls the update routine 72 from the ROM 11. Then, an operation mode is switched to the privileged mode. Here, it is assumed that an interrupt handler, which is started at the time of switching to the privileged mode, is set on the ROM 11. The update request reception unit 33 calls the update routine 72 with a Supervisor Call (SVC) accompanied by the switch to the privileged mode.

In addition, the update request reception unit 33 terminates the update routine 72 and causes an operation mode to switch to the normal mode after the update processing is completed.

The release unit 34 releases the non-updatable state for the chip unique information storage unit 31. After the switch to the privileged mode, the release unit 34 releases the non-updatable state of the write protection register 15 through the privileged gate 14.

The update unit 35 updates the chip unique information of the update target. After the non-updatable state of the write protection register 15 is released, the update unit 35 updates data corresponding to the update data number stored in the chip unique information storage unit 31 to the update data.

After the data is updated, the setting unit 36 sets the write protection register 15 to be in (or return to) the non-updatable state.

Description of Operation

Next, an operation of the microcomputer 1 will be described with reference to flowcharts of FIGS. 4 to 6.

Processing of Switching to Privileged Mode

Figure 4:
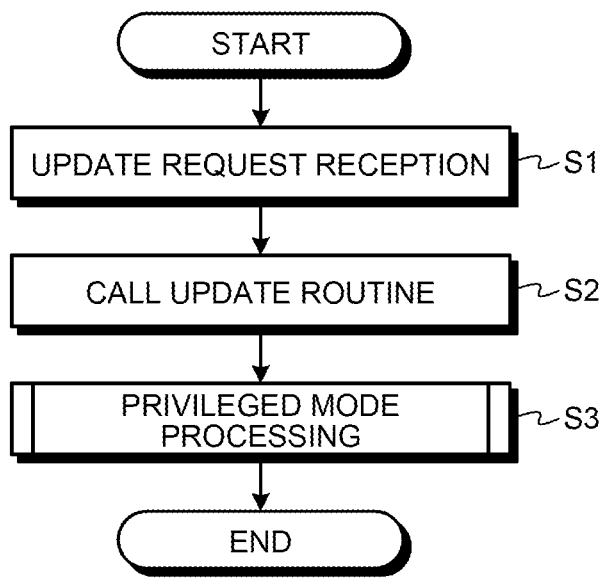
FIG. 4 is a flowchart illustrating processing of switching from a normal mode to a privileged mode according to the first embodiment.

FIG. 4 is a flowchart illustrating processing of switching from the normal mode to the privileged mode according to the first embodiment.

First, the update request reception unit 33 receives the update request together with the update data number and the update data (S1). Subsequently, the update request reception unit 33 calls the update routine 72 of the ROM 11 by the SVC (S2), and executes the update routine 72. As a result, the switch from the normal mode to the privileged mode is performed, so that the microcomputer 1 executes processing in the privileged mode (S3).

Processing in Privileged Mode

Figure 5:
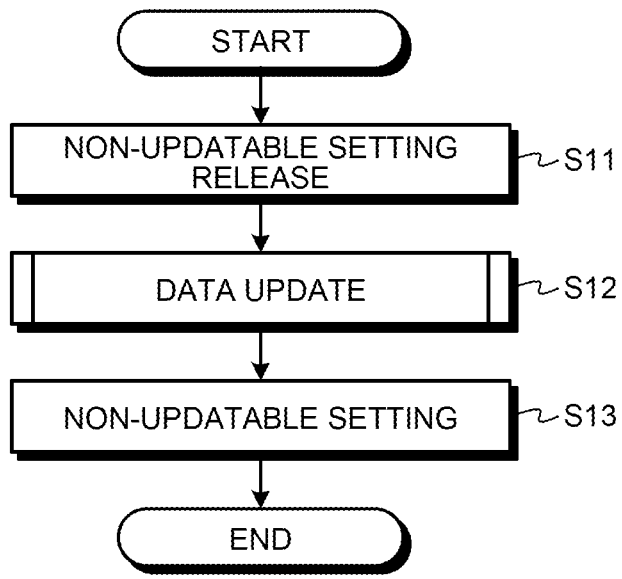
FIG. 5 is a flowchart illustrating processing in a privileged mode.

FIG. 5 is a flowchart illustrating processing in the privileged mode corresponding to S3 in FIG. 4.

First, when an operation mode is switched to the privileged mode, the release unit 34 releases the non-updatable state of the write protection register 15 through the privileged gate 14 (S11). Specifically, in the privileged mode, the release unit 34 outputs to the privileged gate 14 a signal indicating an instruction to update the write protection register 15. Then, the flag information of the write protection register 15 is set to a value indicating the updatable state, thereby releasing the non-updatable state.

Subsequently, after the non-updatable state is released, the update unit 35 updates data, which corresponds to the update data number, stored in the chip unique information storage unit 31 (that is, the data memory 13) (S12).

After the update processing is completed, the setting unit 36 sets the flag information of the write protection register 15 to a value indicating the non-updatable state again through the privileged gate 14 (S13). Then, the update request reception unit 33 ends the processing by the update routine 72, executes a return instruction for switching to the normal mode, and ends the processing. In the normal mode, for example, the CPUFW 73 is executed.

Update Processing

Figure 6:
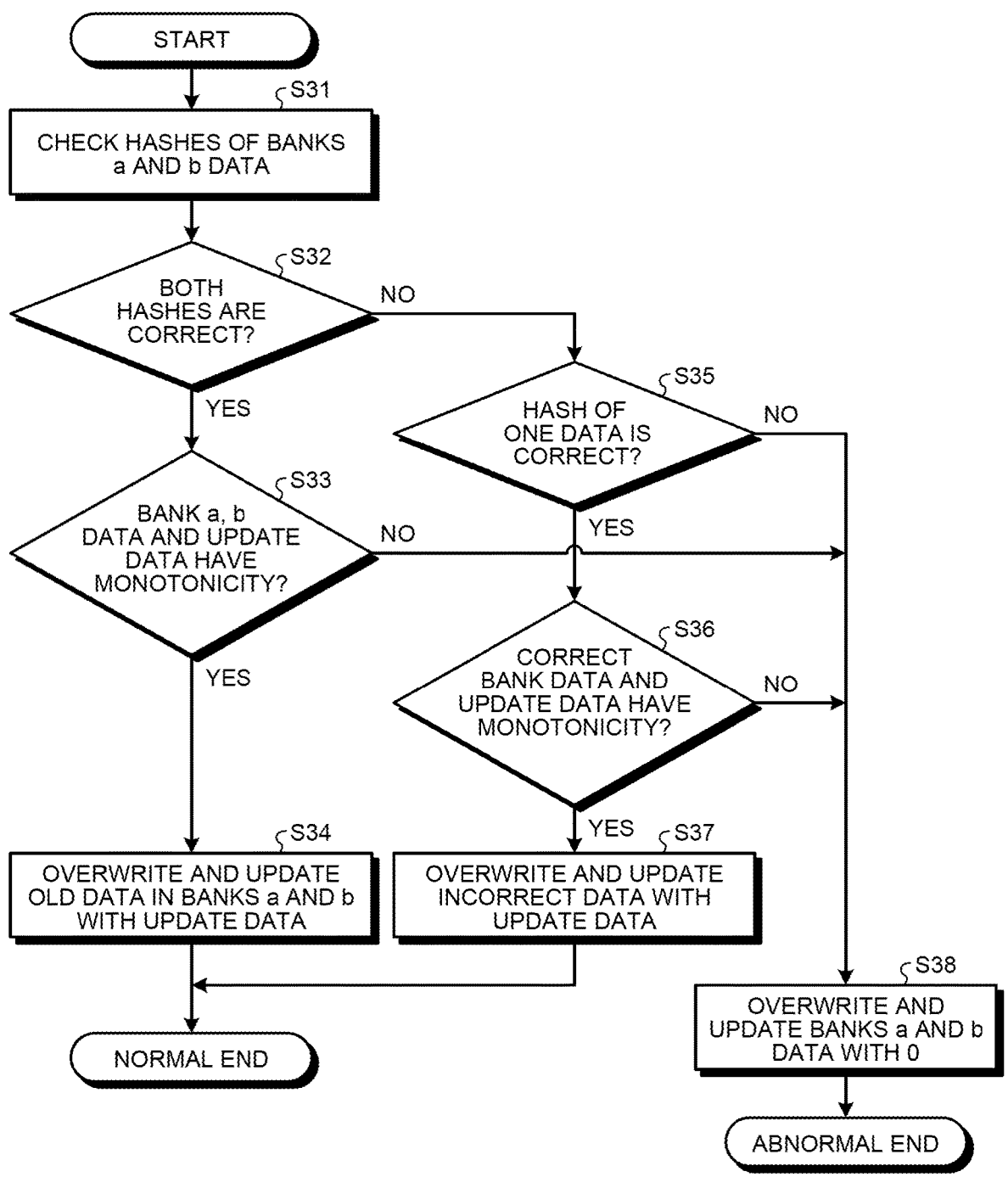
FIG. 6 is a flowchart illustrating data update processing.

FIG. 6 is a flowchart illustrating data update processing corresponding to S12 in FIG. 5. First, the update unit 35 checks the respective hash values for Bank a and Bank b by a known method (S31). When both of the hash values are correct (S32: Yes), the update unit 35 proceeds to S33.

In S33, the update unit 35 determines whether pieces of data indicating the update data numbers for Bank a and Bank b have monotonicity, and whether pieces of the update data for Bank a and Bank b have monotonicity. Monotonicity of the data will be described with reference to FIGS. 7A and 7B. FIG. 7A is a diagram illustrating an example where there is no monotonicity between pieces of data. FIG. 7B is a diagram illustrating an example where there is monotonicity between pieces of data.

The term "monotonicity" used herein means that two pieces of digital data having the same length have the same change between "0" and "1" in the difference. Specifically, in the example illustrated in FIG. 7A, there are two types of differences between two pieces of data (Data 1 and Data 2); a change from "0" to "1", and a change from "1" to "0". In this case, it is determined that these pieces of data do not have monotonicity. On the other hand, in the example illustrated FIG. 7B, there is only one type of difference between two pieces of data (Data 1 and Data 2), that is, a change from "0" to "1" alone. In this case, it is determined that there is monotonicity. It is on the premise that there is monotonicity between pieces of the stored data, and there is monotonicity between the stored data and the corresponding update data. In addition, it is assumed that data having many "1" is recognized as newer data. In the case of the data illustrated in FIG. 7B, Data 2 has more "1" than Data 1, so that Data 2 is recognized as being newer than Data 1. By using such monotonicity, in a case where valid data is stored in each of two buffers, it is possible to determine which data is newer (or older) than another.

Subsequently, in a case where a counter "#c1" is an update target for an example of data having monotonicity between Bank a and Bank b, respective counters "#c1" of Bank a and Bank b are compared. It is assumed that the counter of Bank a is "00000001" and the counter of Bank b is "00000011". The difference between them is only a change from "0" to "1", so that it can be determined that there is monotonicity.

On the other hand, for another example, it is assumed that the counter of Bank a is "00000001" and the counter of Bank b is "00010000". In this case, there are two types of differences; a change from "0" to "1", and a change from "1" to "0". Thus, it can be determined that there is no monotonicity. As described above, the fact that there is no monotonicity deviates from the above premise, and indicates that the data is broken due to the fact that write processing of the past data has not been normally completed.

Returning to FIG. 6, in response to determining that Bank a and Bank b have monotonicity, the update unit 35 determines monotonicity between the newer data (data having more "1") and update data (S33). In response to determining that there is monotonicity between the newer data and the update data (S33: Yes), older data in Bank a or Bank b is overwritten with the update data (S34). Then, the update unit 35 updates a hash value for the overwritten bank by a known method.

In response to determining that Bank a and Bank b do not have monotonicity (S33: No), the update unit 35 proceeds to S38.

When at least one of the hash values for Bank a and Bank b is not correct (S32: No), the update unit 35 determines whether or not the other hash value is correct (Step S35). When the other hash value is correct (S35: Yes), the update unit 35 determines monotonicity of data in the bank (Bank a or Bank b), whose hash value is correct, and the update data (S36). In response to determining that there is monotonicity (S36: Yes), the update unit 35 first copies all the data in the bank having the correct hash value to the other bank having the incorrect hash value, and overwrites and updates the data of the update data number with the update data (Step S37). Then, the update unit 35 updates the hash value of the overwritten bank.

In response to determining that both the hash values are incorrect (S35: No), the update unit 35 proceeds to Step S38. In response to determining that there is no monotonicity between the data of the update data number of the correct bank and the update data (S36: No), the update unit 35 proceeds to S38.

The update unit 35 overwrites and updates all the data in Bank a and Bank b with "0" (S38), and ends the processing. In this case, the "0" represents wrong (or incorrect). Therefore, the update unit 35 can explicitly indicate that pieces of the information stored in Bank a and Bank b are data that cannot be recovered.

In the first embodiment, the case where the data memory 13 stores the chip unique information in two banks has been described, but the chip unique information may be stored in one bank. In addition, the data memory 13 may store the chip unique information in three or more banks.

According to the first embodiment, the microcomputer 1 stores the chip unique information in the data memory 13, and stores, in the write protection register 15, the flag information indicating whether or not update on data in the data memory 13 is allowed. The privileged gate 14 is provided on the bus 19, and controls whether or not to permit access to the write protection register 15 on the basis of a control instruction from the CPU 10. In the privileged mode, the release unit 34 implemented by the CPU 10 outputs to the privileged gate 14 information indicating that the mode is the privileged mode. The CPU 10 as the release unit 34 accesses the write protection register 15, and changes the flag information indicating whether or not the update is allowed, thereby making the updatable state. In the updatable state, the update unit 35 implemented by the CPU 10 updates the information in the data memory 13.

As described above, the microcomputer 1 includes the privileged gate 14 and the write protection register 15, so that data in the data memory 13 can be updated only in the privileged mode. That is, the privileged gate 14 and the write protection register 15 function as a mechanism for controlling the write attribute of data. Furthermore, the microcomputer 1 updates the data by bringing the data memory 13 into an updatable state only when there is an update request. As a result, the microcomputer 1 can prevent data update due to an erroneous program or the like that may occur when a flash memory is used. That is, the microcomputer 1 can cause the data memory 13 to operate like a one-time programmable memory using an e-fuse or an anti-fuse, and can improve the reliability of the update processing.

In addition, the update unit 35 updates the chip unique information to be updated to the update data on the basis of the presence or absence of monotonicity between the stored chip unique information to be updated and the update data of the chip unique information to be updated. In this case, the update unit 35 can determine whether or not the stored data is broken by determining the monotonicity. For example, in a case where there is no monotonicity between the stored chip unique information to be updated and the update data of the chip unique information to be updated, the update unit 35 can determine that it deviates from the above premise and the stored chip unique information to be updated is broken data.

Moreover, in the data memory 13, the chip unique information is stored in a plurality of banks, and the update unit 35 updates the chip unique information to be updated to the update data, based on the presence or absence of monotonicity of data of each bank in the chip unique information to be updated. As a result, the microcomputer 1 can determine whether or not the stored data of the bank is broken. In addition, in a case where there is monotonicity of the data of each bank of the chip unique information to be updated, the update unit 35 updates data (for example, data including the least "1"), whose monotonicity has not progressed, to the update data. Thus, the microcomputer 1 can change the oldest data to the latest data (update data). The microcomputer 1 also stores the latest data and the data immediately before the latest data.

When updating data, it is necessary for the microcomputer 1 to erase data to be rewritten once and to write data after erasing the data, and it takes time to erase or write the data, and when power off or reset occurs at the time of such an operation, there is a possibility that not only writing becomes incomplete but also original data is lost. As described above, by storing the latest data and the immediately preceding data, the microcomputer 1 can perform recovery processing using the immediately preceding data and appropriately manage the data even if the update data is not appropriately updated due to an unintended situation such as a case where the power is turned off when the update data is updated. That is, the update unit 35 can prevent such loss or destruction of data.

Second Embodiment

In the second embodiment, a function of managing an updatable user is further included. Hereinafter, differences from those of the first embodiment will be mainly described.

Chip unique information and the counter are important data for operating the microcomputer 1, so that they are desirably updated only when accessed by a user with limited privilege.

If there is only one user who operates the microcomputer 1, it is not necessary to manage the privilege, but it is conceivable that each of a plurality of users accesses the microcomputer 1. In this case, it is necessary to introduce user privilege management.

Figure 8:
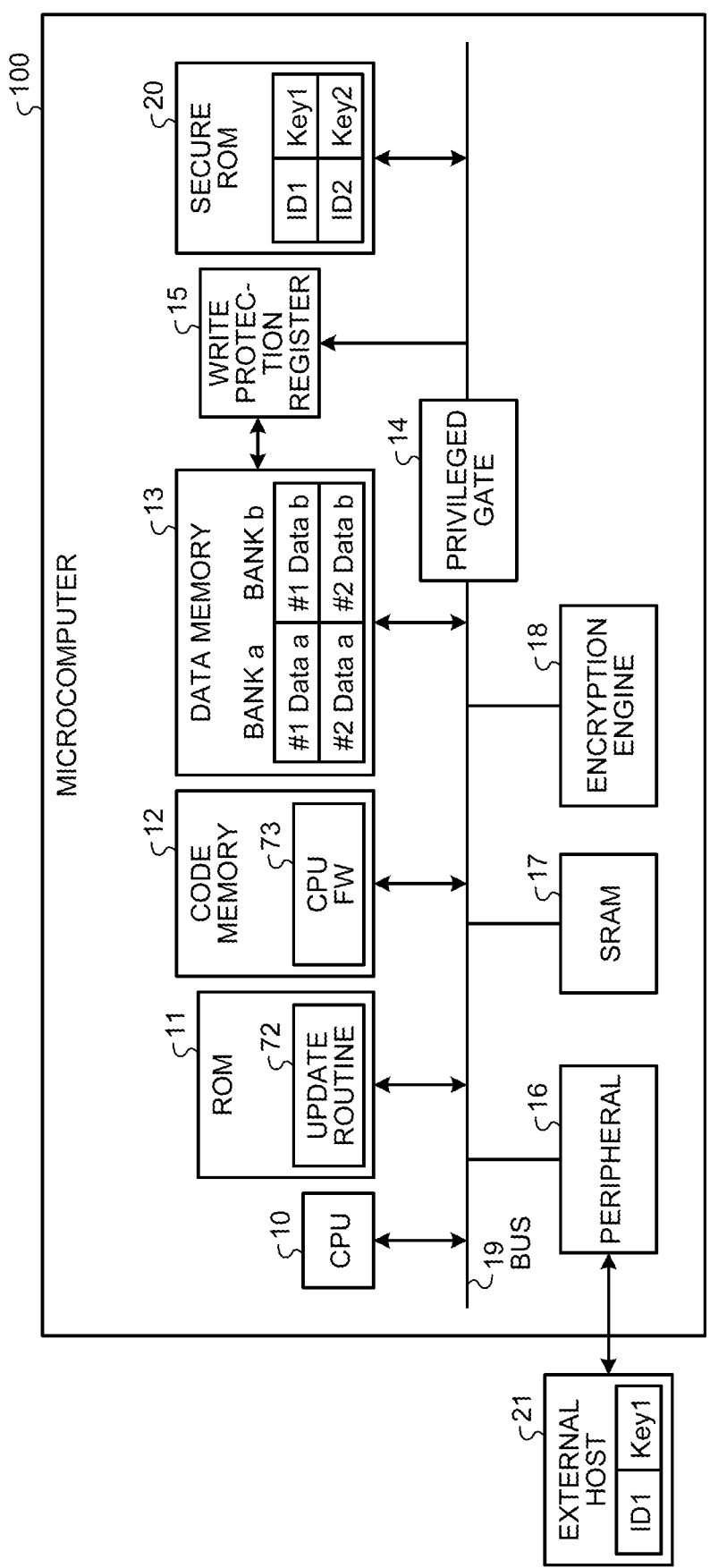
FIG. 8 is a schematic diagram illustrating an example of a hardware configuration of a microcomputer according to a second embodiment.

FIG. 8 is a schematic diagram illustrating an example of a hardware configuration of a microcomputer according to the second embodiment.

A microcomputer 100 further includes a secure ROM 20. The secure ROM 20 is a non-rewritable nonvolatile memory, and stores confidential information such as a user ID. The secure ROM 20 holds user IDs (for example, ID1 and ID2) and common keys (For example, Key1 and Key2).

Furthermore, the microcomputer 100 is connected to an external host 21 via a communication module or the like included in the peripheral 16. The external host 21 is, for example, an information processing device including a microprocessor. The external host 21 stores a user ID (ID1) and a common key (Key1). Further, the external host 21 transmits the user ID, an update data number, and update data when making an update request to the microcomputer 100.

Figure 9:
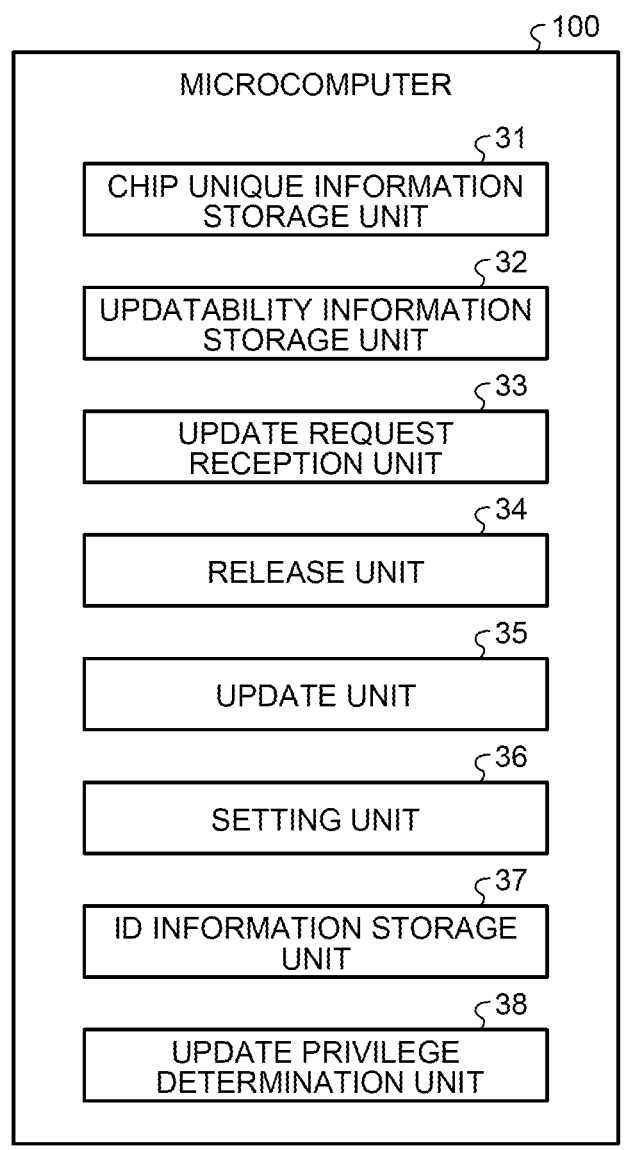
FIG. 9 is a block diagram illustrating an example of a functional configuration of a microcomputer 100 according to a second embodiment.

FIG. 9 is a block diagram illustrating an example of a functional configuration of the microcomputer 100 according to the second embodiment. The microcomputer 100 includes an ID information storage unit 37 and an update privilege determination unit 38 in addition to the functions of the foregoing microcomputer 1 illustrated in FIG. 2.

The ID information storage unit 37 is implemented by the secure ROM 20. The CPU 10 executes programs stored in the ROM 11 and the code memory 12. The update privilege determination unit 38 is implemented by the encryption engine 18.

The ID information storage unit 37 stores a user ID and a common key. The update privilege determination unit 38 determines the update privilege of the user of an update request source by comparing a result of encryption processing using the common key corresponding to the user ID of the update request source of the information stored in the ID information storage unit 37 with a result of encryption processing using the common key executed by the device (external host 21) corresponding to the user ID.

Privileged Mode Processing of Second Embodiment

Figure 10:
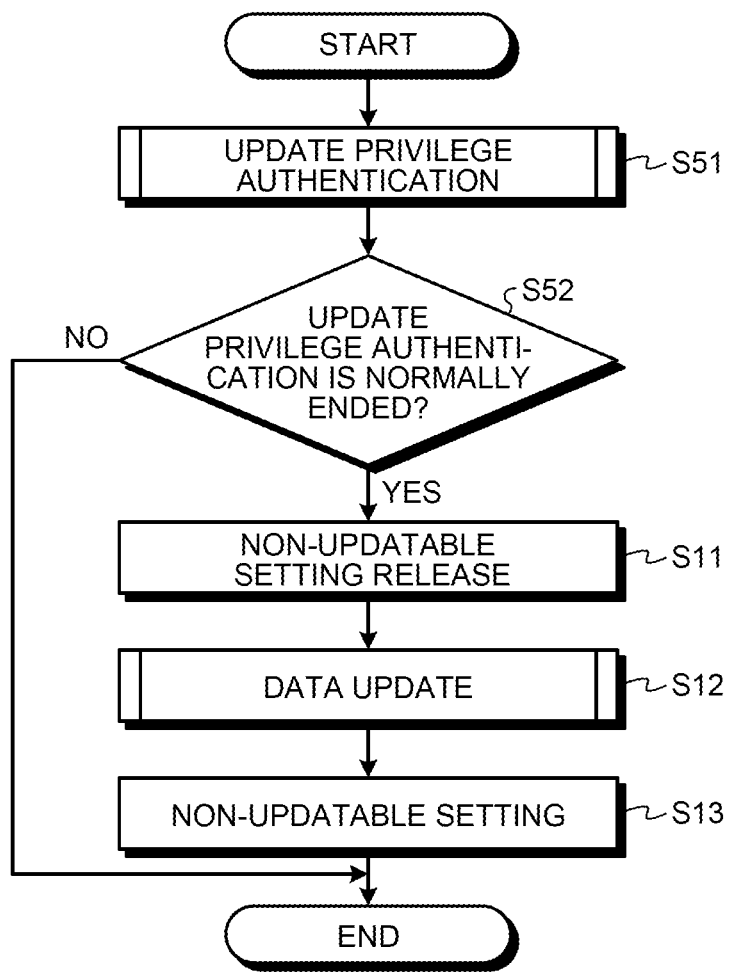
FIG. 10 is a flowchart illustrating processing in a privileged mode according to the second embodiment.

FIG. 10 is a flowchart illustrating operation of processing in a privileged mode according to the second embodiment.

As illustrated in FIG. 10, update privilege authentication processing is performed before the processing illustrated in FIG. 4 is performed (S51). Then, when the update privilege authentication processing normally ends (S52: Yes), the processing illustrated in FIG. 4 is started (S11 to S13). On the other hand, when the update privilege authentication processing does not normally end (S52: No), the processing is terminated without executing the data update processing (S12) and so on. Thus, the microcomputer 100 can be configured not to receive data update by a user who does not have update privilege.

Update Privilege Authentication Processing

Figure 11:
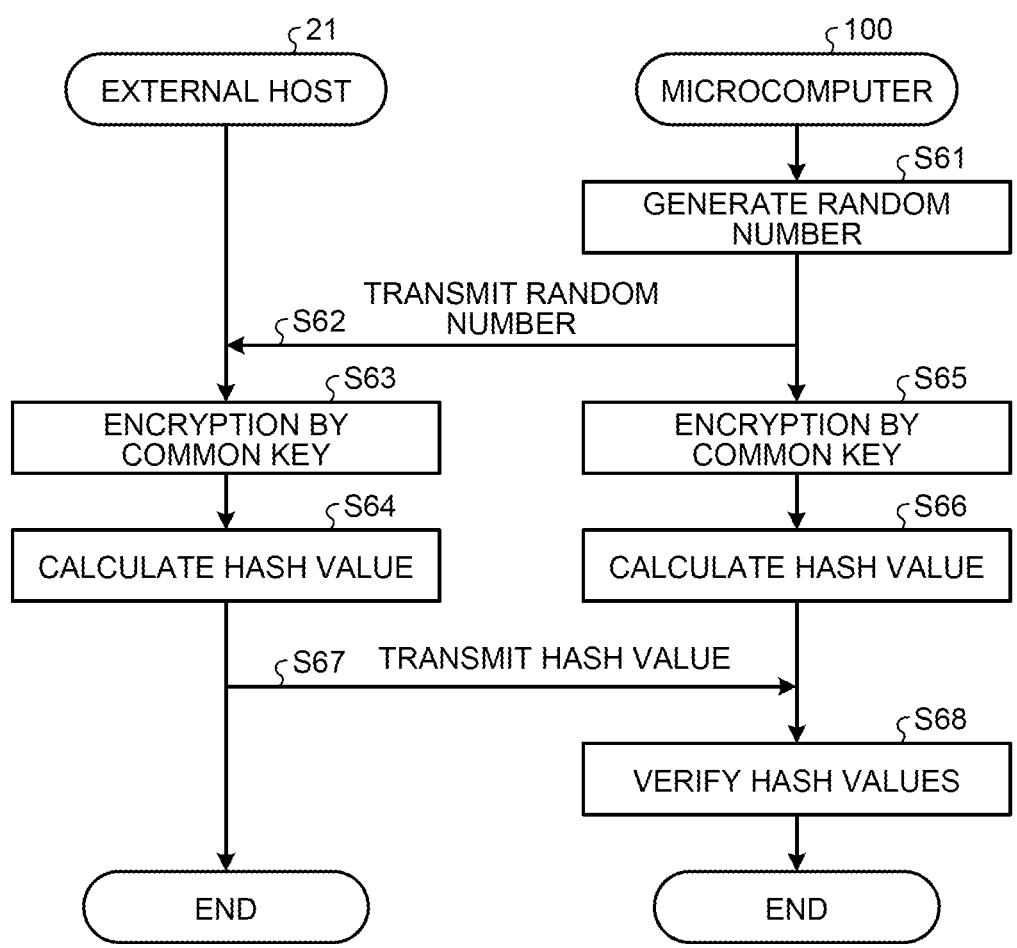
FIG. 11 is a flowchart illustrating update privilege authentication processing.

FIG. 11 is a flowchart illustrating an operation in the update privilege authentication processing. First, the update privilege determination unit 38 generates a random number (S61). Subsequently, the update privilege determination unit 38 transmits the random number to the external host 21 (S62). The external host 21 encrypts the random number with the common key (S63), and calculates a hash value (S64). Similarly, the update privilege determination unit 38 encrypts the random number with the common key stored in the ID information storage unit 37 (S65), and calculates a hash value (S66).

The external host 21 transmits the hash value generated in S64 to the microcomputer 100 (S67). The update privilege determination unit 38 verifies the hash value acquired from the external host 21 and the hash value generated in S66 (S68). Specifically, the update privilege determination unit 38 compares the hash values, and when the hash values match, the update privilege determination unit determines that the processing is a normal end indicating that the privilege is present, and when the hash values do not match, the update privilege determination unit determines that the processing is an abnormal end. In this manner, by determining the update privilege of the user who is the update request source, data update by an unauthorized user can be prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first memory configured to store information by a plurality of banks;
a second memory configured to store state information indicating whether or not update on the information of the first memory is allowed;
a gate device provided on a bus and configured to control whether or not to permit access to the second memory based on a control instruction; and
one or more hardware processors configured to
output, to the gate device, a control instruction to permit access to the second memory corresponding to a predetermined mode,
set the state information of the second memory to indicate an updatable state, and
update the information of the first memory,
wherein the one or more hardware processors are configured to
perform the update of the information based on presence or absence of monotonicity between the information in the first memory and the update information, and
perform the update of the information based on monotonicity between banks storing pieces of information to be updated.

2. An electronic apparatus comprising:
a memory configured to store information; and
one or more hardware processors configured to
receive an update request for information stored in the memory,
release a non-updatable state for the memory,
update the information of the memory, and
set a non-updatable state for the memory after the information is updated,
wherein the one or more hardware processors are configured to
perform the update of the information based on presence or absence of monotonicity between the information in the memory and the update information, and
perform the update of the information based on monotonicity between banks storing pieces of information to be updated.

3. The electric apparatus according to claim 2, wherein the memory is configured to hold a hash value for each of the banks,
the one or more hardware processors are configured to perform the update of the information based on whether the hash values of the banks are correct or not.

4. The electric apparatus according to claim 2, further comprising a secure memory configured to store information associating a user ID with a common key of the user ID,
wherein the one or more hardware processors are configured to:
determine an update privilege of a user of an update request source by comparing
a result of encryption processing using the common key of the user ID of the update request source, and
a result of encryption processing using a common key executed by
a device corresponding to the user ID; and
perform the release of a non-updatable state based on a result of the determination of the update privilege.

5. A method implemented by a computer, the method comprising:
storing information in a first memory of the computer by a plurality of banks;
storing state information, in a second memory of the computer, indicating whether or not update on the information of the first memory is allowed;
controlling whether or not to permit access to the second memory based on a control instruction;
outputting a control instruction to permit access to the second memory corresponding to a predetermined mode;
setting the state information of the second memory to indicate an updatable state; and
updating the information of the first memory,
wherein the updating includes updating the information of the memory by update information, based on presence or absence of monotonicity between the information of the first memory and the update information, and
the updating is performed based on monotonicity between banks storing pieces of information to be updated.

6. A method implemented by a computer, the method comprising:
receiving an update request for information stored in a memory of the computer, the information being stored by a plurality of banks;
releasing a non-updatable state for the memory;
updating the information of the memory; and
setting a non-updatable state for the memory after the information is updated by the updating,
wherein the updating includes updating the information of the memory by update information, based on presence or absence of monotonicity between the information of the memory and the update information, and
the updating is performed based on monotonicity between banks storing pieces of information to be updated.

7. The method according to claim 6, further comprising holding, for each of the plurality of banks, a hash value in the memory,
wherein the updating is performed based on whether the hash values of the banks are correct or not.

8. The method according to claim 6, further comprising:
storing, in a secure memory of the computer, information associating a user ID with a common key of the user ID; and
determining an update privilege of a user of an update request source by comparing
a result of encryption processing using the common key of the user ID of the update request source, and a result of encryption processing using a common key executed by a device corresponding to the user ID, wherein the releasing of a non-updatable state is performed based on a result of the determining of an update privilege.

\* \* \* \* \*